United States Patent
Donzis et al.

(10) Patent No.: US 11,743,205 B2
(45) Date of Patent: *Aug. 29, 2023

(54) INTERNET PROVIDER SUBSCRIBER COMMUNICATIONS SYSTEM

(71) Applicant: PERFTECH, INC., San Antonio, TX (US)

(72) Inventors: Henry M. Donzis, San Antonio, TX (US); Lewis T. Donzis, San Antonio, TX (US); Rodney D. Frey, San Antonio, TX (US); John A. Murphy, San Antonio, TX (US); Jonathan E. Schmidt, San Antonio, TX (US)

(73) Assignee: PERFTECH, INC., San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/746,857

(22) Filed: May 17, 2022

(65) Prior Publication Data

US 2022/0278942 A1    Sep. 1, 2022

Related U.S. Application Data

(63) Continuation of application No. 16/842,521, filed on Apr. 7, 2020, now Pat. No. 11,336,586, which is a
(Continued)

(51) Int. Cl.
*G06F 15/16* (2006.01)
*H04L 47/80* (2022.01)
(Continued)

(52) U.S. Cl.
CPC .............. *H04L 47/801* (2013.01); *H04L 9/40* (2022.05); *H04L 45/742* (2013.01);
(Continued)

(58) Field of Classification Search
CPC . H04L 47/801; H04L 67/563; H04L 61/5007; H04L 9/40; H04L 67/564;
(Continued)

(56) References Cited

U.S. PATENT DOCUMENTS 4,272,493 A    6/1981 Subramanian et al.
5,105,184 A    4/1992 Pirani et al.
(Continued)

OTHER PUBLICATIONS

Anonymous, "TCP Flag Key", UNC Office of Arts and Sciences, Jan. 3, 2012.
Corner et al., "Transport Control Protocol (TCP)", Nov. 2005.

*Primary Examiner* — Moustafa M Meky

(57) ABSTRACT

A method for communicating in real-time to users of a provider of Internet access service, without requiring any installation or set-up by the user, that utilizes the unique identification information automatically provided by the user during communications for identifying the user to provide a fixed identifier which is then communicated to a redirecting device. Messages may then be selectively transmitted to the user. The system is normally transparent to the user, with no modification of its content along the path. Content then may be modified or replaced along the path to the user. For the purposes of establishing a reliable delivery of bulletin messages from providers to their users, the system forces the delivery of specially-composed World Wide Web browser pages to the user, although it is not limited to that type of data.

20 Claims, 5 Drawing Sheets

Related U.S. Application Data continuation of application No. 16/293,268, filed on Mar. 5, 2019, now Pat. No. 10,616,131, which is a continuation of application No. 15/090,899, filed on Apr. 5, 2016, now Pat. No. 10,225,210, which is a continuation of application No. 14/482,144, filed on Sep. 10, 2014, now Pat. No. 9,307,041, which is a continuation of application No. 13/342,144, filed on Jan. 2, 2012, now Pat. No. 8,838,809, which is a continuation-in-part of application No. 10/623,893, filed on Jul. 21, 2003, now Pat. No. 8,108,524, which is a continuation of application No. 10/023,674, filed on Dec. 18, 2001, now Pat. No. 7,328,266.

(51) Int. Cl.

| | |
|---|---|
| *H04L 67/02* | (2022.01) |
| *H04L 9/40* | (2022.01) |
| *H04L 61/5007* | (2022.01) |
| *H04L 67/50* | (2022.01) |
| *H04L 67/563* | (2022.01) |
| *H04L 67/564* | (2022.01) |
| *H04L 67/568* | (2022.01) |
| *H04L 45/74* | (2022.01) |
| *H04L 45/745* | (2022.01) |
| *H04L 67/2871* | (2022.01) |
| *H04L 69/329* | (2022.01) |

(52) U.S. Cl.
CPC ........ *H04L 45/745* (2013.01); *H04L 61/5007* (2022.05); *H04L 63/1416* (2013.01); *H04L 67/02* (2013.01); *H04L 67/535* (2022.05); *H04L 67/563* (2022.05); *H04L 67/564* (2022.05); *H04L 67/568* (2022.05); *H04L 67/2871* (2013.01); *H04L 69/329* (2013.01)

(58) Field of Classification Search
CPC ... H04L 67/535; H04L 67/568; H04L 45/742; H04L 45/745; H04L 63/1416; H04L 67/02; H04L 67/2871; H04L 69/329
USPC .......................................................... 709/217
See application file for complete search history.

(56) References Cited

U.S. PATENT DOCUMENTS

| | | | |
|---|---|---|---|
| 5,481,562 A | 1/1996 | Pearson et al. | |
| 5,724,525 A | 3/1998 | Beyers et al. | |
| 5,740,549 A | 4/1998 | Reilly et al. | |
| 5,751,956 A | 5/1998 | Kirsch | |
| 5,894,479 A | 4/1999 | Mohammed | |
| 5,913,040 A | 6/1999 | Rakavy et al. | |
| 5,937,392 A | 8/1999 | Alberts | |
| 5,974,451 A | 10/1999 | Simmons | |
| 5,991,735 A | 11/1999 | Gerace | |
| 6,014,698 A | 1/2000 | Griffiths | |
| 6,041,356 A | 3/2000 | Mohammed | |
| 6,141,010 A | 10/2000 | Hoyle | |
| 6,148,332 A | 11/2000 | Brewer et al. | |
| 6,188,398 B1 | 2/2001 | Collins-Rector et al. | |
| 6,195,691 B1 | 2/2001 | Brown | |
| 6,205,432 B1 | 3/2001 | Gabbard et al. | |
| 6,286,001 B1 | 9/2001 | Walker et al. | |
| 6,314,451 B1 | 11/2001 | Landsman et al. | |
| 6,385,592 B1 | 5/2002 | Angles et al. | |
| 6,438,125 B1 | 8/2002 | Brothers | |
| 6,442,529 B1 | 8/2002 | Krishan et al. | |
| 6,466,967 B2 | 10/2002 | Landsman et al. | |
| 6,516,338 B1 | 2/2003 | Landsman et al. | |
| 6,553,376 B1* | 4/2003 | Lewis | H04L 65/612 |
| 6,574,321 B1 | 6/2003 | Cox et al. | |
| 6,584,492 B1 | 6/2003 | Cezar et al. | |
| 6,594,305 B1* | 7/2003 | Roeck | H04N 7/17309 725/111 |
| 6,594,706 B1 | 7/2003 | DeCoursey et al. | |
| 6,598,082 B1 | 7/2003 | Douglis et al. | |
| 6,615,039 B1 | 9/2003 | Eldering | |
| 6,628,314 B1 | 9/2003 | Hoyle | |
| 6,636,856 B2 | 10/2003 | Pasquali | |
| 6,725,060 B1 | 4/2004 | Chhatriwala et al. | |
| 6,725,203 B1 | 4/2004 | Seet et al. | |
| 6,771,290 B1 | 8/2004 | Hoyle | |
| 6,772,200 B1 | 8/2004 | Bakshi et al. | |
| 6,779,118 B1 | 8/2004 | Ikudome et al. | |
| 6,785,659 B1 | 8/2004 | Landsman et al. | |
| 6,829,780 B2 | 12/2004 | Kraft et al. | |
| 6,845,400 B2* | 1/2005 | Macpherson | H04L 67/51 709/227 |
| 6,880,123 B1 | 4/2005 | Landsman et al. | |
| 7,213,071 B2* | 5/2007 | DeLima | H04L 67/02 709/227 |
| 7,227,889 B1* | 6/2007 | Roeck | H04N 21/6583 725/111 |
| 7,237,251 B1 | 6/2007 | Oz et al. | |
| 7,263,558 B1 | 8/2007 | Khirman et al. | |
| 7,328,266 B2 | 2/2008 | Schmidt et al. | |
| 7,409,456 B2 | 8/2008 | Sitaraman | |
| 7,689,721 B2 | 3/2010 | Mousseau et al. | |
| 8,095,666 B2 | 1/2012 | Schmidt et al. | |
| 8,108,524 B2* | 1/2012 | Donzis | H04L 45/742 709/227 |
| 8,198,524 B2 | 6/2012 | Bastian et al. | |
| 8,793,386 B2 | 7/2014 | Schmidt et al. | |
| 8,838,809 B2* | 9/2014 | Donzis | H04L 9/40 709/227 |
| 9,307,041 B2* | 4/2016 | Donzis | H04L 67/02 |
| RE46,459 E | 6/2017 | Ikudome et al. | |
| 9,727,658 B2* | 8/2017 | Donzis | H04L 63/1441 |
| 10,225,210 B2* | 3/2019 | Donzis | H04L 67/535 |
| 10,616,131 B2* | 4/2020 | Donzis | H04L 63/145 |
| 10,834,157 B2 | 11/2020 | Schmidt et al. | |
| 11,336,586 B2* | 5/2022 | Donzis | H04L 61/5007 |
| 2001/0049737 A1 | 12/2001 | Carolan et al. | |
| 2002/0049968 A1 | 4/2002 | Wilson et al. | |
| 2002/0113994 A1 | 8/2002 | Smith et al. | |
| 2002/0116531 A1* | 8/2002 | Chu | G06Q 30/02 709/206 |
| 2002/0116645 A1* | 8/2002 | Cloutier | H04L 63/12 726/3 |
| 2002/0132607 A1 | 9/2002 | Castell et al. | |
| 2002/0133565 A1 | 9/2002 | Huat | |
| 2002/0143981 A1* | 10/2002 | DeLima | H04L 67/61 709/233 |
| 2003/0014539 A1 | 1/2003 | Reznick | |
| 2003/0093516 A1 | 5/2003 | Parsons et al. | |
| 2003/0106067 A1* | 6/2003 | Hoskins | H04L 69/167 725/111 |
| 2004/0015405 A1 | 1/2004 | Cloutier et al. | |
| 2004/0073812 A1 | 4/2004 | Wesinger et al. | |
| 2004/0230659 A1 | 11/2004 | Chase | |
| 2005/0114458 A1 | 5/2005 | Gottlieb | |
| 2006/0095525 A1 | 5/2006 | Mousseau et al. | |
| 2007/0081543 A1 | 4/2007 | Brenes et al. | |
| 2008/0043694 A1 | 2/2008 | Mousseau et al. | |
| 2008/0109521 A1 | 5/2008 | Mousseau et al. | |
| 2014/0351690 A1* | 11/2014 | Donzis | G06F 16/9566 715/234 |
| 2017/0357727 A1* | 12/2017 | Donzis | H04L 67/563 |

* cited by examiner

INTERNET PROVIDER SUBSCRIBER COMMUNICATIONS SYSTEM

BACKGROUND OF THE INVENTION

1. Field of the Invention

The invention is generally related to customer relations and management communication systems and is more specifically directed to a method for the enforced delivery of messages to customer subscribers and users of an Internet Service or transport service provider.

2. Discussion of the Prior Art

Over the next several years in the U.S., 85 million new users will start using the Internet and 77% of U.S. households will be connected to the Web. Clearly, the Internet market will continue to grow in existing and altogether new ways. The Internet is now a critical part of our communications options. Innovation will continue to be a major factor associated with the Internet as enterprising companies find new ways to offer faster, more expanded services ranging from access, security, quality and class of services, as well as content offerings. No matter what these expanded services or applications turn out to be, the rapid adoption of Internet use will continue to increase and that increase will have profound effects on the providers who support these millions of users.

Currently, the providers that physically connect subscribers to the Internet are very limited in their ability to communicate back to their subscriber base. If a provider wants to communicate with customers about planned outages or problems, viruses being broadcast from the subscriber PCs, billing issues, or emergency information, the provider is limited to some very unreliable approaches such as phone calls, e-mails, or bulletins in monthly billing statements. None of these approaches offer assured timely delivery, and most require a great deal of effort with uncertain results. Today, the common method used to notify the subscriber is to let the subscriber discover the particular problem and then contact the provider for assistance and information. Unlike cable television wherein the cable company can force "crawlers" and other informational communication to the viewer's television screen, the Internet service provider must rely upon the subscriber to voluntarily and manually access the informational Web pages that relate to the subscriber's system. The subscribers of the provider may not use or reveal other services that might have been useful such as their use of e-mail or even their e-mail addresses. The other customer relations communication channel used by the provider is the accompanying flier that is mailed with the monthly bill. These channels are unreliable and not timely for much of the communication that the provider could utilize that would substantially reduce the cost of supporting the subscriber base. A simple example is enforced notification of scheduled system "down time" due to maintenance. Virtually all subscribers who are notified of an upcoming service interruption will not place the support telephone calls that typically inundate the provider support facilities under such circumstances.

Due to the ever growing Internet user population, a solution that could avoid these calls would not only greatly reduce the unnecessary call volume being placed on provider call support centers, but would also help improve customer confidence, leading to better customer loyalty and retention.

Enforced delivery of messages has been available with auxiliary client software components such as enrollment and use of an "Instant Messaging" system as offered by AOL and Microsoft. Enforced delivery of messages has also been available with auxiliary client software components associated with certain provider authentication protocols. In all cases, the software becomes machine, operating system, and operating system version dependent, must be installed by the subscriber or user, and the installation must be supported by the provider.

U.S. Pat. No. 6,148,332, entitled: MANDATORY MESSAGE DISPLAY AND REPORTING SYSTEM, issued to C. M. Brewer on Nov. 14, 2000 discloses a messaging system including a software program to be loaded on a PC that is closely linked to the PPP ("The Point-to-Point Protocol," as defined by RFC 1661) or PPPoE ("A Method for Transmitting PPP Over Ethernet," as defined by RFC 2516) that the Internet service provider provides. Specifically, this is "LOG-ON" software that the user must have in order to initiate and maintain service. The intent of the application is to force advertising windows on the user's screen, i.e., a mandatory display. The main components of this system are that the software must be loaded on the user PC, the window is specifically not on the Web browser, and the advertising window cannot be removed without losing the connection to the Internet service provider service.

In addition to ISP support systems, it is becoming increasingly desirable to support inter-communication between a user and a local, sub-level provider, such as an establishment or transportation provider supplying Wi-Fi connectivity for its customers or passengers. The Wi-Fi "hotspot" market is anticipated to grow to a half-million within four years. Hotspot providers have no access to their own provision channel in order to push advertisements to their users other than at sign-on time . . . that is, once per visit. The overriding problem in this phenomenon is the conflict between the exploding popularity and the lack of a way to make manage it from a cost/risk aspect. Currently, there are three ways that providers attempt to gain value from the installation of a hotspot:

Charge for the service as you use it (not popular with users) but may work for critical areas like airline clubs, captive passengers in a train or airplane, and other public access areas, where users who really need it will pay for it.

Associate a free use of the service with other products such as a DSL or cable modem home subscription.

Use the service as a way to attract customers to your store such as anticipated by chain restaurants and the like.

SUMMARY OF THE INVENTION

The subject invention specifically eliminates a requirement for any client software components and specifically utilizes Web page access. Automatic modification of the content of received data also can be accomplished with other unmodified Web applications in accordance with the invention. The invention presents a Web page as a replacement for the user-requested page, as an interim page before the requested page, or as an additional "pop-up" browser window. Enforcement takes advantage of the near-universality of Web browser utilization and of the protocol to log successful deliveries. In accordance with the teachings of the invention, the elimination of a client software component can create the entirety of the functionality of the system in a hardware or software device that can be distributed throughout the provider infrastructure through a simply installed, fail-safe network connection without customer participation in the installation process.

The architect of the invention is adopted to unobtrusively co-exist with the current Internet transport networks, providing critical performance monitoring and automated messaging to insure that transport network operators, ISPs, content providers, and the users have communication links. This can include aggregation routers of typical ISPs, neighborhood connectivity at the ISP CMTS level and even hot-spots such as Wi-Fi connections at a retail establishment level.

The method of the subject invention provides users with active screens informing them of transport or Internet Service Provider network problems, thus allowing customers to know of any situation real-time and avoid overwhelming the provider's congested call-centers with costly and unnecessary trouble-report calls. In addition, users will be able to monitor their own Internet performance and differentiate problems between transport and content parties and avoid the costly inquiry calls that would otherwise occur. The estimated payback in technical support call reduction alone is a matter of a couple of months with indirect customer satisfaction increasing the true value much more. The reduction of technical support center calls provides a very attractive payback to the providers. In addition, other services may be offered by facilitating localized content delivery such as emergency information and/or advertising. Once the invention, which may be implemented as a hardware device, or as software running on a standard computer system, is merged within the provider network, additional services are provided through software upgrades at the provider without requiring installation at the user's site. Specifically, all of this is done within the network without touching user equipment.

The subject invention allows providers to have an active vehicle with which to communicate to a user (or subscriber group) while the user is browsing the Internet. These services are manifested in a number of ways depending on the providers' physical and logical network architecture. The methodology is addressable to all IP provider connection approaches from Broadband (Cable, DSL, Satellite, Fixed Wireless) to traditional dial-up services.

In addition to offering the provider a cost savings proposition in technical support call elimination and in improving customer confidence, the system of the subject invention also offers the Provider a way to directly reach users by particular demographics for emergency information and advertising purposes. Within the realm of advertising, the ability to tie ad content to local geographies, as well as user demographics, will allow very specific ad content to be presented to users. Such high quality advertising can result in incremental provider revenue as well as open up the opportunity for expanded products that provide Internet access at a lower price because of advertising subsidization.

The preferred embodiment of the invention can be entirely contained within a hardware or software device that is connected to the provider network that performs the modification of the Web information delivered to the user. The enforcement can be guaranteed with Web browser activity by the targeted user. The near-universality of Web browser utilization by Internet users presents a near-universal enforcement of the desired customer management communication from the provider to the user and on a real-time basis and confirmation of delivery is available both from system logs as well as optional Web page click-through.

The provider creates the special communication through the three-part definition:

1. the resolution from IP address to a customer identification by account number, modem MAC address or serial number, other fixed identifier, or temporary identifier such as cookie placement to meter the delivery frequency.
2. The policy of delivery describing the circumstances of delivery such as time of delivery, frequency, triggering activity, and the like.
3. The associated Web page or other content to be delivered and type of page delivery (replacement, insert, pop-up).

The system relies upon any of several standard router mechanisms to redirect Web traffic. Some existing protocols developed for transparent Web caching permit the installation to take place while the system is fully operational and renders it immune to device failure by supporting normal functionality should the device fail. These protocols are preferred but not necessary.

The system examines the source IP address of a request and, if not cached, makes a query to obtain the customer identification to check if a policy is in force. There are different protocol options that can be utilized to obtain this relationship that may be kept in DNS (Domain Name System), DHCP ("Dynamic Host Configuration Protocol," as described in RFC 1531), LDAP ("Lightweight Directory Access Protocol," as described in RFC 1777), or external database servers. The device endeavors to utilize the valid duration of these relationships to cache the information and reduce network administrative message overhead.

When policies are not necessarily directed at specific users but, instead, to IP address-identified individuals or subnets, the delivery process can proceed without user-lookup but with metering based upon the IP address alone. The use of cookies placement and cookie examination by visible or non-visible, null-Web pages can control the metering of the delivery to groups of users. The cookie-based metering can, additionally, include effective metering control of users who experience IP address changes during the delivery schedule and to individual users in a group of multiple users behind address-translating routers exhibiting a single IP address to the Internet.

When no policy is in force for a particular user or group of subscribers, the connection is allowed to proceed normally and the expected Web page is displayed. If a policy is in force for that user, the policy is enforced and, as an example, the user may see a "pop-up" browser window appear containing special customer communications. The pop-up window can request further action or utilize any of the rich array of options available in Web browsers.

In systems with many devices connected, an optional management console can be utilized to consolidate the numerous devices into presenting itself as a single system to the existing provider infrastructure. This consolidation can reduce or eliminate administrative overhead of the existing provider infrastructure when expanding or changing the system of devices. The management console can also consolidate the administrative activity of the Web redirecting devices to reduce that overhead.

In addition, systems that utilize alternative address management databases to reconcile subscriber account identification with currently issued IP addresses can be used identically to the DHCP query for Cable Modem address within the consolidating and management device by substituting the alternate account identification for the Cable Modem address or unique subscriber ID and subsequently relaying the respective policy information for that subscriber to the redirecting device upon discovery of the associated IP address.

Alternatively, the redirecting device reflects packets back to the router while maintaining state information about the browsing session. Once an HTTP GET message is seen and the URL and HTTL header are examined, if it is desired to send a replacement message, the redirecting device replies directly to the user, as if it is the server, and the redirecting device sends a message to the server, as if it is the client, that terminates the session. If the page is not to be replaced, the redirecting device can simply continue to reflect packets back to the router.

In a further implementation of the system, the Cable MSO is replaced with a hotspot network. Both are Internet providers with the difference being one of scale, with the latter being much more appropriately associated with the advertising application as opposed to the service/support application. In a typical application of this configuration, the hotspot infrastructure appears in two basic classes:

a) Hotspots independently connected directly to the Internet through a firewall using a NAT (many-to-one address translation) whereas all traffic from users to the Internet hops onto the Internet at the site; and b) Hotspots VPN'd in one way or another such that all users are given addresses of a core provider's remote network and "tunneled" back to a central network for control.

The centrally owned instance that also tunnels all users back to a central network can be serviced very much like that of a cable Internet provider.

The small, directly-connected, independently installed, opportunistic provider can be serviced by a two-terminal device that would install in the cable between the Internet service and the hotspot NAT router and transmitter/receiver called an Access Point (AP). Such a system requires little or no access to identifying the actual user either to target advertising as appropriate or to meter the frequency of pop-up ads to individuals at the ISP level, while such an application is supported at the user level, permitting the provider to communicate with each user on a one-to-one basis. Specifically, the identification of the users, who are anonymous to the Internet traffic because they are on the other side of the NAT, is supported by the subject invention. Users behind such a NAT can receive evenly dispatched messages that can be metered through the use of the placement and examination of cookies by the Web interaction with the device through either visible or non-visible null Web pages that process the cookie tagging.

DETAILED DESCRIPTION OF THE PREFERRED EMBODIMENT

Figure 1:
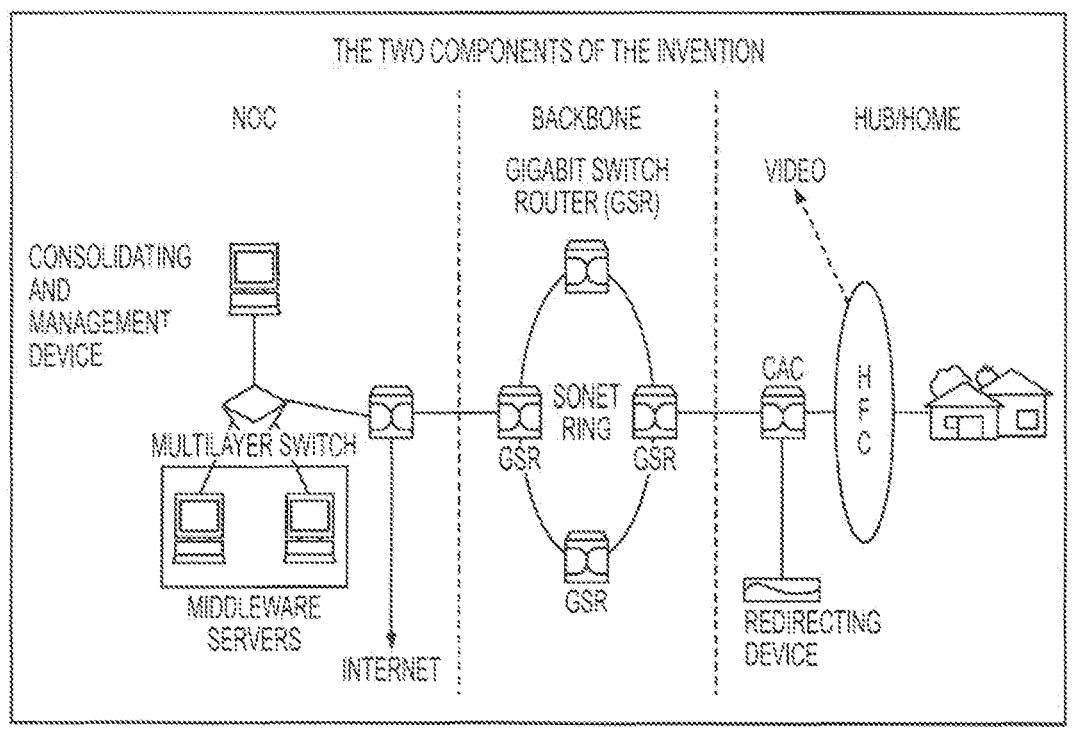
FIG. 1 shows the two components of the invention: the redirecting device and the consolidating and management device.

The architecture of the preferred invention is designed especially to adapt to a cable operator's IP network. Comparable components and protocols exist in other broadband systems such as DSL and wireless, as well as other Internet service provider transports, such as analog and digital dial-up and private line environments, for which the scope of the invention is intended to include.

Internet service and transport providers provide their users with a pipeline to the Internet, but are not directly involved in the content obtained by those users. Typically, this pipeline is transparent to the user, with no modification of its content along the path. In some cases, web caching or other performance enhancement technology may be provided, but this still strives to maintain the original content. The invention provides a method and apparatus whereby this content may be modified or replaced along the path to the user. For the purposes of establishing a reliable delivery of bulletin messages from providers to their users, the invention specifically forces the delivery of specially-composed World Wide Web browser pages to the user, although it is not limited to that type of data. These may be displayed permanently, temporarily, or in separate pop-up browser windows, according to policies set by the provider irrespective of the user's intended browsing destination. The result of this system is the ability of the provider to make use of communications to users without the requirement of a special client software component to be present on the user's personal computer or other browsing device. Another benefit of the invention is its implementation as a hardware or software device that incorporates simplified, fail-safe integration into the provider's infrastructure. In addition, due to the use of the standards of World Wide Web browsers, all the Web features, such as interactivity in the same or separate pop-up windows, become available to the provider. The policies set by the provider can be for specific users or groups of users with identified characteristics or activity.

Over 90% of cable television system operators in the United States provide high speed (broadband) Internet access through their system with an early adoption rate of 8% in the U.S. and 5% globally.

Cable systems, upgraded to serve digital channels, can support data-over-cable Internet access through the industry standard, DOCSIS, which sends the Internet data inside a compatible packet in the same form as digital TV's MPEG2. In addition to supporting MPEG2 digital television, the Internet access infrastructure is required to support upstream data in the 5 to 45 MHz spectrum for the 2-way Internet activity.

A variety of early adopters experimented with several schemes to transport two-way data over existing cable infrastructure, however, DOCSIS emerged as the standard. The DOCSIS 1.0, 1.1, and 2.0 Radio Frequency Interface (RFI) Specification SP-RFI-105-991105 is what the majority of US vendors and cable operators have agreed to implement. In addition, the industry supports an interoperability laboratory that tests and enforces compatibility complete with certification labels.

The spectrum on the cable plant allows for downstream, or forward, path signals that occupy the 54- to 860-MHz band, with channels spaced at the standard 6 MHz originally designed to handle the over-the-air: NTSC video signals. In fact, the entire cable infrastructure retains this channelized imprint from the over-the-air spectrum.

The upstream, or return path DOCSIS signals generally occupy from 5 to 42 MHz (a spectrum not used by over-the-air television and, in fact, is the spectrum used by "short wave" broadcast when propagated over the air). The upstream spectra can, therefore, have variable channel spacing, depending on the signal's type and format. Because of the noisy and legacy design implications, upstream signals with DOCSIS are limited in bandwidth and, as with the Cisco CMTS (Cable Modem Termination System), broken up into six upstream segments each individually allocated to a small neighborhood of approximately 200-300 houses.

The choice of employing compatibility with the legacy 6 MHz channelization permits compatibility with other parts of the system allowing a minimal amount of disruption to the existing infrastructure when it DOCSIS-compatible Internet data access is added. In addition, much of the upgrades in plant and equipment required for the provisioning of broadband Internet access are in common with the upgrades needed to expand service to digital television services and pay-TV which can fit from 4 to 12, typically 6, digital channels into each of the same 6 MHz channels of the spectrum.

The digital channels have digital data encoded in MPEG2 frames that include the DOCSIS data. The DOCSIS data can utilize an entire 6 MHz channel or be interleaved with other services but that is not known to be a feature that is utilized. Each frame includes a program identifier, PID, of which the DOCSIS data is allocated one: HEX 1FFE. The cable modem searches for the channel with the DOCSIS PID when it is powered up. The channel can be any of the system channels but is typically in the digital channel range above 350 MHz.

Once the DOCSIS modem finds its downstream data, the dialog begins negotiations with the head end to determine various parameters of operation such as the upstream channel, the power of the modem's transmitter, modulation technique, symbol rate, and finally the negotiation into an encrypted communications session using X509 certificates based upon a combination of data permanently installed in the cable modem:

A serial number
A cryptographic public key
An Ethernet MAC address
The manufacturer's identification Further system authentication integrates the registration of the modem and customer's account within the billing system. The ability to communicate directly with customers or groups of customers sharing a common problem directly relieves a substantial portion of the support burden from both transport and ISP vendors. It will also improve support quality and customer satisfaction.

For the preferred embodiment, the simplest environment, that of a broadband cable system, is used as an example. In such a cable system over which broadband Internet data is offered, there are two basic types of devices in the invention as shown by FIG. 1.

Redirecting device—a device residing in the neighborhood along with the cable access concentrator. This product is intentionally located at the edge of the network, providing intelligence at the last scalable point in the cable operators' IP network (in closest proximity to the user). The number of redirecting devices will replicate the number of access concentrators within the network, and the device will interconnect to one of the access concentrator's Ethernet ports, or in a manner as to have access to user upstream traffic. This device could be located anywhere in the infrastructure where access to user upstream traffic is available, but the closer it is located to the user, the greater the possibility for delivering messages due to upstream service outages. In one embodiment, the insertion of the redirecting device includes web cache control protocol, switching or redirecting mechanisms in an existing ISP router may be utilized. In another example, the redirecting device is inserted in the path of web traffic from the user through an ISP.

Consolidating and managing device—a device located in the cable operator's NOC (Network Operations Center) providing data services and management control to the deployed redirecting devices. This product will be interconnected to the NOC network, which interconnects all of the NOC servers as well as the Internet portal.

Bulletin Services and the Benefits: The location of the bulletin services equipment can be made optimal for solving the very set of problems described above. When located at each uBR/CMTS (Universal Broadband Router, Cisco's name for its Cable Modem Termination System product line), it can survey the state of the upstream and downstream network and automatically provide high visibility of the status to the customer. It can deliver individual content to specified users or groups with individually tailored policies (frequency, circumstances, pop-up, banner, front, back, etc.). It can target customers issuing packets with signatures of virus-generated communication. And, it can determine upstream problems and assign the trouble to either the transport vendor or the Internet service provider for further action, if required, or simply eliminate the call because of the visibility of the problem and the subsequent reinstitution of operation.

The bulletin services clearly can eliminate service calls. Many "problems" are not problems and can be eliminated, such as providing the customer a pre-announcement of a scheduled maintenance downtime or a clear description of an existing, general Internet problem out of the control of the local system. Problems that are quite deterministic as to which vendor owns the responsibility can often be automatically determined. Unless the entire system is totally "dead," the trouble call can be deflected to the responsible vendor with some helpful information. Customers under the influence of a "virus" can cause the system a lot of trouble without the customer having visible symptoms. Real-time communications with the customer can, often automatically, enlighten that customer to the contamination and possibly issue a required repair procedure which, if ignored, might result in the subscription being temporarily disabled.

Direct communication with the Internet access customer has been used effectively for several years through pop-ups and banners, but these have only been issued from the destination site that was sought by the browsing customer. They have been used for extending the advertising viewing space and time as well as for special information bulletins issued from that destination site.

Direct communication with the customer from the transport vendor or ISP vendor, independent of the destination sought by the customer and without blocking the customer's access to that destination has not been previously developed and, therefore, available. However, the services that directly target real-time bulletins can provide a mechanism that forges a general-purpose facility and provide this capability.

Virtually all calls due to downtime that had been previously scheduled and announced. That could easily be a sizable portion of the installed base.

Virtually all calls that can be automatically diagnosed as non-local, upstream Internet congestion whether assigned to a particular provider or general Internet malfunctions. Progress on the problem can be presented in a bulletin.

Virtually all calls that are due to local infrastructure outages that are upstream of the uBR/CMTS. These problems can be diagnosed and announced automatically or manually to the customer. Progress in repair can be highly visible to the customer who will get better information by viewing the real-time bulletin of the progress than holding on a telephone line.

Virus preventative cut-offs.

Problems in the first category are clearly stated to the customer as being supported by the carried provider. Calls to will be immediately re-directed to the provider. Trouble in the second category is often associated with a general cable outage and usually results in a call to the cable television repair service first. In such cases, both are re-instituted simultaneously and the appearance of a working TV is the signal for the recovery of the cable modem. Troubles in the third category will result in an "informational" call of short duration.

This brief analysis indicates that bulletin services can eliminate most calls, the longest and most complicated calls, and clearly increase customer satisfaction. The reduction in calls affects both Level-1 call-center personnel as well as Level-3 "last resort", highly trained personnel.

The Bulletin Services can reduce other network personnel overhead:

The location of the bulletin services device at the uBR/CMTS permits it to check every connection for the signature of a virus-generated "storm" that causes system-wide degradation. It is also in the position to be directed, manually, by network personnel, to inform the customer that a virus infection is causing difficulties on his PC and that remedial action is required. A written bulletin can include step-by-step procedures to remedy the problem saving a rather lengthy telephone dialog.

This capability can be extended to react to a variety of signals of misuse activity of the system by customers either automatically or by simple, manual issuance of an appropriate bulletin.

The network support personnel are the most highly paid and notoriously overworked. Reductions in these areas are clearly highly valuable.

Figure 2:
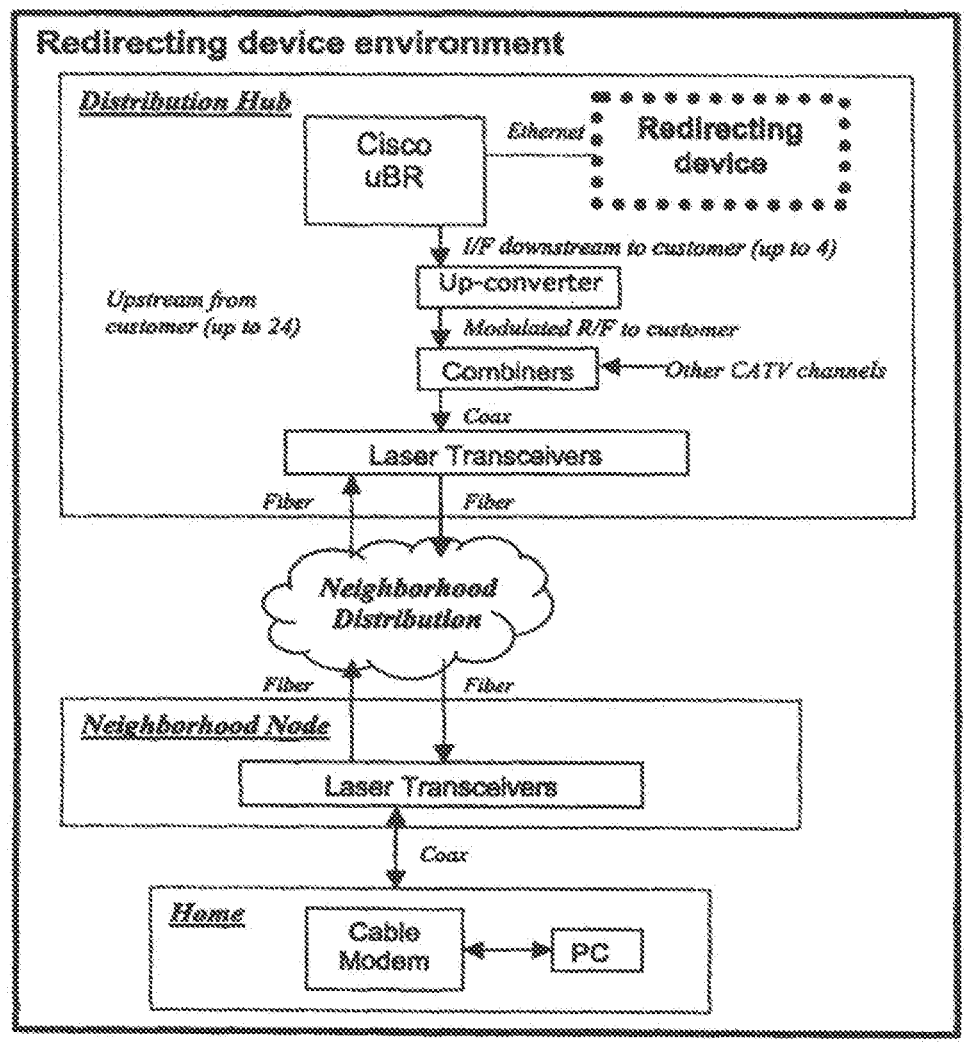
FIG. 2 shows the redirecting device at the network edge with the cable access concentrator/router and other various network components.

Redirecting Device Environment: FIG. 2 shows the redirecting device at the network edge with the cable access concentrator/router and other various network components:

Platform Specification

Hardware chassis (e.g., NEBS-compliant or standard rack mount, or stand-alone), with processor, RAM, non-volatile storage. This may be offered as an integral hardware solution running a standard or an embedded operating system, or as a software solution running on a standard PC/UNIX/Mac workstation or other computer system.

Optional facilities for configuration, troubleshooting, and out-of-band management.

Interface to the provider infrastructure, e.g., Ethernet, SONET, and the like.

Figure 3:
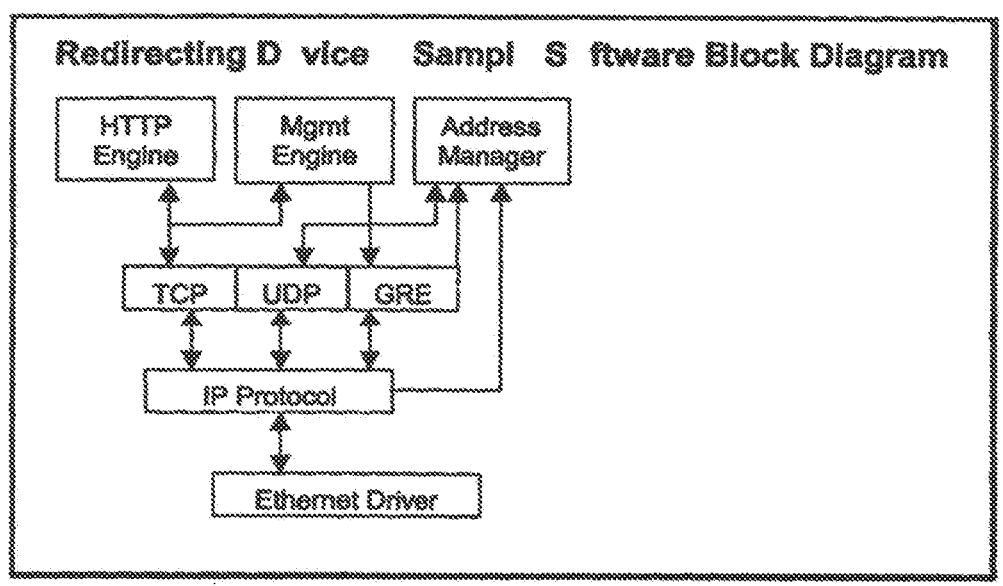
FIG. 3 provides a summary of how the redirecting device navigates through the four critical modules.

Redirecting Device Software Block Diagram: FIG. 3 provides a summary of how the redirecting device navigates through the four critical modules. The HTTP engine accepts connections for pages that may need to be replaced, parses URL, determines replacement strategy, provides replacement pages from the policy database, and proxies to a "real" server on an as-needed basis. The management engine receives and stores policy from the system, provides replacement policy as requested by the HTTP engine, notifies the GRE and IP layers (Generic Routing Encapsulation, as defined by RFC 2784) of address policy (i.e., intercept or not, lifetime and the like), and implements management protocol between redirecting and management devices. The address manager is notified by the GRE and/or IP when a new address is detected, and requests address information between redirecting and management/consolidating devices and will asynchronously send to the policy engine. When GRE is used, such as when WCCP is used to insert the redirecting device into the network, the GRE is implemented for high performance, and examines incoming packets from the Ethernet driver. If there is not any fragmentation and the source address is known and does not require interception, the packet can immediately be transmitted back to the router. This ensures good performance for the most likely cases. If fragmentation does exist, the packet is given to the IP layer for further processing and the completed packet is then given by the IP layer back to the GRE for processing. If the IP address includes a policy that requires further processing, the GRE header is removed and sent back to the IP stack for further processing by the HTTP engine. Alternatively, functions such as IP defragmentation and delivery of replacement pages can be implemented below the IP stack with improved efficiency.

With specific reference to FIG. 3, the following should be noted:

Software Application Specification—WCCP v1 and v2, unicast and multicast, GRE support, L2 support as it becomes available from Cisco.

Cisco-like command line interface.

SNMP (Simple Network Management Protocol) support as required.

Protection from access by consumers, e.g., filters and/or SSH (Secure Shell).

Keeps policy list by IP address, as provided by Bulletin Manager

For non-intercepting IP addresses, packet is vectored back to router at wire speed For intercepting, box must proxy to real server in order to have access to reverse traffic, or a connection to the real server can be allowed and then later intercepted to avoid having to proxy.

Traffic modification replaces page, which can provide new content, a redirection to a different page (possibly on another server), or provide a pop-up with the main page fetching the originally-requested content Traffic modification based on schedule policy:

One-shot

Interval

Frequency-changing interval

Acknowledgement from user can modify policy

Policy loaded by Bulletin Manager

Additional Specifications: The consolidating and management device is located in the NOC and licensed based on number of deployed devices within the operating network:

Platform Specification

Same specifications as redirecting device except:

Faster CPU with additional RAM

Larger storage facility

Additional Interfaces similar to other NOC oriented hardware

Software Application Specification

Protocol between devices should be open and publishable

Front-end management console allows:

Defining redirecting devices

Obtaining status/configuration of redirecting devices

Defining policy

Loading web pages to be distributed

Back-end management:

Monitoring/upgrading redirecting devices

Integrates with customer systems, including billing

Integrates with DHCP or other address management system to cross-reference customer ID with current IP address.

Implementation Approach: Whenever a redirecting device receives a TCP SYN packet, it looks in its table to find the IP address of the source. If the address is not in the table, or is expired, it sends a request to the address management device, along with a unique identifier for any policy that it has cached for that IP address (in the case of an expired entry). Depending on configuration, it could then forward the original packet back to the router, or discard or delay the packet. If the address is unknown, it also creates an entry for the IP address with a short expiration, so that it will not query the consolidating and management device again for a little while.

The address management device then queries the address management database (e.g., DHCP) to obtain the Cable Modem address associated with that IP address, and may also obtain the DHCP lease expiration time. Once the consolidating and management device determines the user associated with the IP address, if a message for that user is desired, then it can send new policy information to the directing device along with a unique identifier for that policy. If the unique policy identifier sent by the redirecting device indicates that the redirecting device already has the correct policy information available, then the consolidating and management device does not need to re-send it; it can just re-activate it. In addition, the DHCP lease expiration time is sent, even if no message is desired. The redirecting device updates its table so that it will not query the consolidating and management device again concerning that IP address until the DHCP lease expires, or more likely, some fraction of that time, perhaps with a limit.

Systems that utilize alternative address management databases to reconcile subscriber account identification with currently issued IP addresses can be used identically to the DHCP query for Cable Modem address within the consolidating and management device by substituting the alternate account identification for the Cable Modem address and subsequently relaying the respective policy information for that subscriber to the redirecting device upon discovery of the associated IP address.

The loading of the policy from the consolidating and management device to the redirecting device is asynchronous from the above processing, i.e., the redirecting device will simply continue to reflect packets for the IP address until the policy information changes. Likewise, if there is a failure in the communications between the redirecting device and consolidating and management device, including the consolidating and management device itself, then the redirecting device will simply reflect packets back to the router.

In some cases, the consolidating and management device will send policy information to the redirecting device before being queried by the redirecting device. When a redirecting device initializes, it will send a packet to the consolidating and management device indicating that it is starting fresh. If the consolidating and management device knows of policy information that should exist in that redirecting device, it can send it ahead of any requests by users.

In addition, a consolidating and management device must maintain a list of addresses located at each redirecting device, so that if consolidating and management device is loaded with new policy information, it can send that policy immediately, rather than waiting for the address lease to expire.

When a consolidating and management device sends a policy to a redirecting device, it should include the IP address, and, for neighborhood-wide messages, a mask, and the message or modification to be performed for that address. When a redirecting device expires the IP address from its cache, it should also deactivate the policy, but keep the policy available. A single policy may be applied to multiple IP addresses.

When a redirecting device receives a connection for which it wants to send a message, it accepts the connection as if it is the server, so that the HTTP GET message is seen. Then, the URL and HTTP header can be examined as required. If it is then desired to send a replacement message, a redirecting device creates a socket that will appear to be the server and send the replacement page back to the user, as if it is the server. If the page is not to be replaced, the redirecting device will connect to the real server and proxy the data back to the user.

Alternatively, the redirecting device reflects packets back to the router while maintaining state information about the browsing session. Once an HTTP GET message is seen and the URL and HTTL header are examined, if it is desired to send a replacement message, the redirecting device replies directly to the user, as if it is the server, and the redirecting device sends a message to the server, as if it is the client, that terminates the session. If the page is not to be replaced, the redirecting device can simply continue to reflect packets back to the router.

Care must be exercised when sending a replacement or modified page to do so at an appropriate point in the data stream. For example, if a GET is requesting a JPEG image, then it is not possible to substitute an HTML document. Only a GET that is requesting an initial page should be allowed. This can generally be determined by examining the HTTP header.

Figure 4:
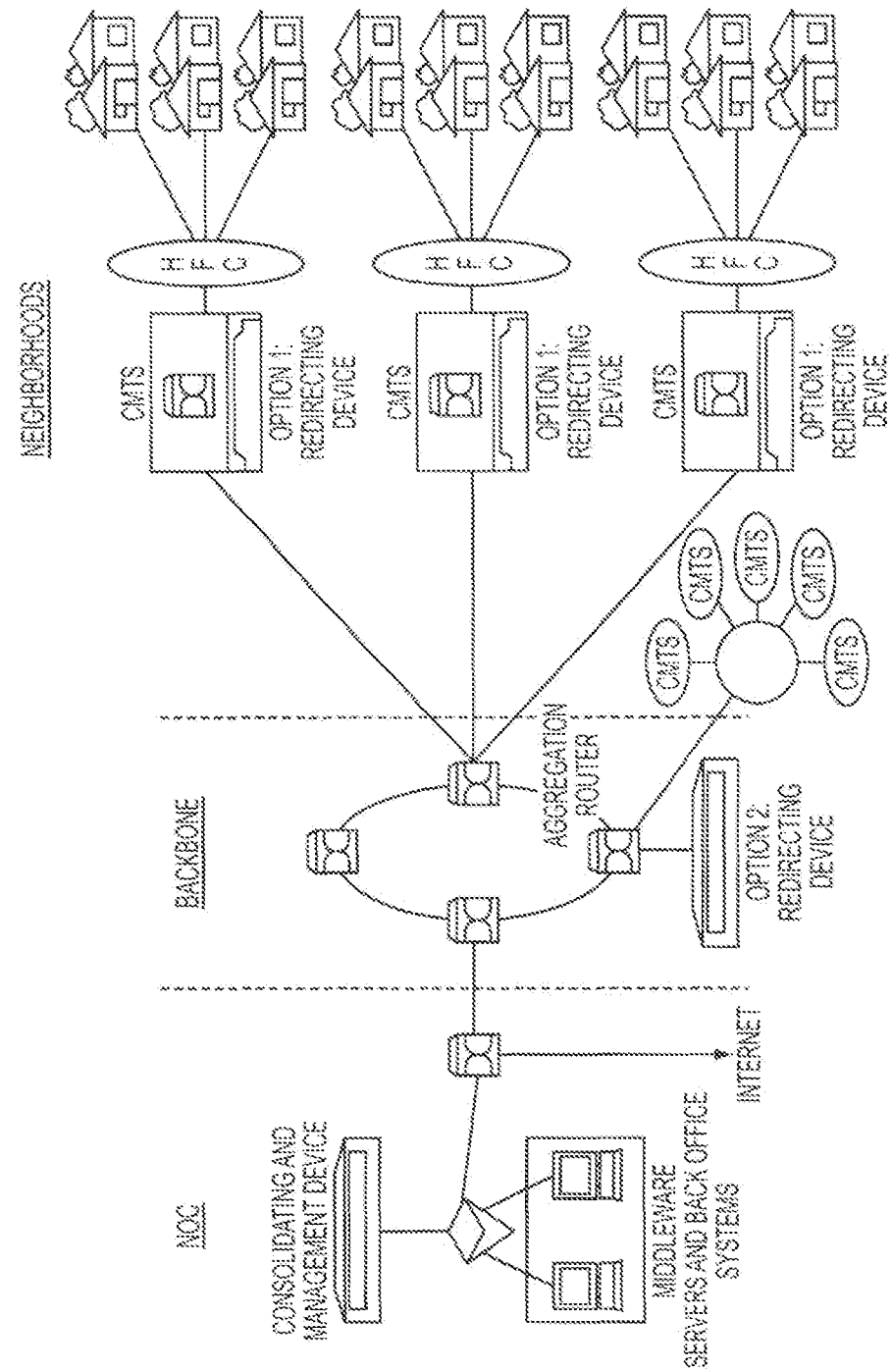
FIG. 4 shows alternate locations on a network incorporating the redirecting device of the subject invention.

"Neighborhood" or Localized Implementation: An alternative configuration is shown in FIG. 4. In this configuration, the redirecting device may be at the aggregation router level or at the CMTS or neighborhood level. In fact, there is not any limitation to the number of redirecting devices in the network and each level provider, at the ISP level, the router level or the neighborhood level, can include an independent redirecting device.

Figure 5:
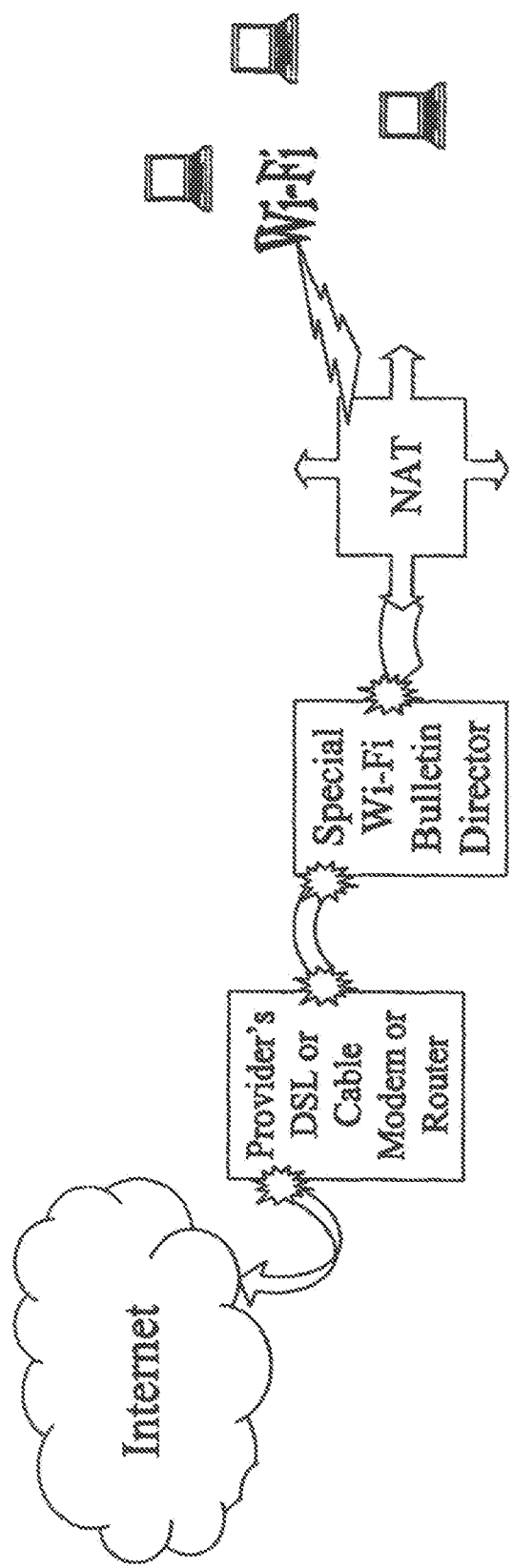
FIG. 5 shows the redirecting device as utilized on a Wi-Fi system.

In a Wi-Fi type system, as shown in FIG. 5, the redirecting device is installed between the provider and a router, either using direct routing or as a NAT (Network Address Translator) gateway. This permits the Wi-Fi provider to communicate with each of the users 1-N on the system at any point in time, while still permitting single subscriber connectivity with the ISP. In this configuration, the specific user can be identified behind the NAT by sending a "null" message from the redirecting device to each user on line via the Wi-Fi, as they actively browse, and setting a cookie and examining the existence of such cookies. The examination then identifies each individual user. The Wi-Fi provider can then direct specific to each user on an individual or a group basis.

In the Wi-Fi application, the NAT is connected to a Wi-Fi network typically adapted for accommodating a plurality of users. In its preferred form the redirecting device is configured to identify each of the plurality of users on the Wi-Fi network. This may be accomplished by directing the redirecting device to send a message to all of the users on the Wi-Fi network with a request for an automatic response. The redirecting device then identifies each of the users from the automatic response. This will then support the ability to send a selected one of the identified users.

What is claimed is:
1. A method, comprising:
providing, by a redirecting device, an identifier to a consolidating and management device, the identifier based on accessed user upstream traffic from a destination site;
creating, by the redirecting device, an entry in the redirecting device, the entry having a time expiration period during which the redirecting device will not query the consolidating and management device; and redirecting a message, based on the accessed user upstream traffic, to a display on a message vehicle occurring from the redirecting device without involvement from the destination site.

2. The method of claim 1, wherein the message vehicle is at least one of:
a pop-up window on the user computer; and
a prompt provided on the user computer.

3. The method of claim 1, further including a step of transmitting to the user the message vehicle for displaying and communicating the message from the consolidating and management device to the user.

4. The method of claim 1, wherein the consolidating and management device utilizes at least one of:
a web cache control protocol; and
switching mechanisms in an existing ISP router or switch.

5. The method of claim 1, wherein the identifier is a modem address unique identifier of the user.

6. The method of claim 1, wherein the message is transmitted in response to an event determined by the redirecting device.

7. The method of claim 1, wherein the user is identified to belong to a defined group of users and wherein the message is selectively sent to a pre-selected user group.

8. The method of claim 1, wherein the redirecting device performs at least one of:
works through Web browsers irrespective of the World Wide Web destination sought by the user identifier;
returns the user to the Original World Wide Web destination after the message has been transmitted;
operates with multiple types of content;
comprises a hardware device that is connected at various points, in plurality, in a provider infrastructure;
comprises a software system installed on a computer system connected at various points, singly or in plurality, in a provider infrastructure;
identifies each of the plurality of users by performing at least one of: temporarily redirecting each active user to a visible or non-visible, null-Web page that sets a cookie with the required information to identify an action and user in the future and capturing an identity and previous activity flagged by the set cookie;
sends a selected message to a selected one of the identified users;
includes an ability to acquire knowledge of policy information, received from the consolidating and management device, when a Web or other request is detected with only an identifying IP address;
minimizes the overhead of acquiring user parameters through caching of the user parameters for a determined portion of time;
operates in connection with a consolidating system management device for permitting a group of system devices to be viewed by a provider as a single system; and
provides optional fail-safe operation of each device so failure does not disrupt other normal browsing and Internet activity of the user but results only in an interruption of bulletin delivery.

9. The method of claim 8, further including a step of providing optional fail-safe operation of each device such that failure does not disrupt other normal browsing and Internet activity of the user but results only in an interruption of bulletin delivery.

10. The method of claim 1, further including a step of defining a policy for at least one of:
controlling the selective transmission of messages to the user;
a Web page or other page information;
timing and frequency of delivery; and
activating the redirecting device to deliver a message in response to other user activity, wherein the activating comprises defining at least one of:
a defined destination;
an amount of activity by the user; and
requests carrying a signature of virus contamination.

11. The method of claim 1, further including a step of generating a plurality of independently designated policies to be delivered correctly to the user even if some policy events invoke in simultaneity.

12. The method of claim 1, further comprising identifying the user by using data available from the user and provider infrastructure to provide the identifier based on the user upstream traffic by using an enforced delivery of a Web page to be used in distribution and subscription of new users without prior knowledge of serial numbers associated with the new user's interface equipment and without requiring the new users to utilize special software.

13. The method of claim 12, further comprising at least one of:
using the enforced delivery of a Web page to reduce the volume of telephone support requests by an enforced pre-announcement of known, future system outages due to scheduled maintenance;
using the identifier for detection of "signature" forms of Internet packets indicating a presence of undesirable content;
wherein the undesirable content is a virus;
transmitting a message identifying the undesirable content to at least one of:
a provider and the user;
logging the undesirable content identifying message;
enforcing the delivery of other user-beneficial information currently displayed on the manually accessed provider information Web page.

14. The method of claim 1, further including at least one of:
detecting and logging a number of simultaneously requested Web connections; and
flagging users that are utilizing more than one simultaneous device per subscription.

15. The method of claim 1, further including a step of transmitting explanations to be issued, in an enforced manner, to subscribers, after a service interruption, in such a manner as to alleviate customer dissatisfaction by illuminating and explaining a problem and efforts taken in a future time to eliminate the problem.

16. The method of claim 1, further including a step of logging at least one of:
successful implementation of policies to each user; and
interactive responses that have been requested within the policy.

17. The method of claim 1, further including a step of inserting at least one of:
a redirecting device in the path of web traffic from the user through an ISP;
a redirecting device in the path of web traffic from the user through an aggregation router; and
a redirecting device in the path of web traffic from the user through a CMTS.

18. The method of claim 1, further including at least one of:
 inserting a redirecting device in the path of web traffic between a Network Address Translator (NAT) and an ISP;
 wherein the NAT is connected to a Wi-Fi network;
 wherein the Wi-Fi accommodates a plurality of users; and
 wherein the redirecting device is further configured to identify each of the plurality of users on the Wi-Fi network.

19. A non-transitory computer readable medium comprising instructions that, when read by at least one processor, cause the at least one processor to perform:
 providing, by a redirecting device, an identifier to a consolidating and management device, the identifier based on accessed user upstream traffic from a destination site;
 creating, by the redirecting device, an entry in the redirecting device, the entry having a time expiration period during which the redirecting device will not query the consolidating and management device; and
 redirecting a message, based on the accessed user upstream traffic, to a display on a message vehicle occurring from the redirecting device without involvement from the destination site.

20. A system, comprising:
 a redirecting device; and
 a consolidating and management device;
 wherein the redirecting device:
  provides an identifier to the consolidating and management device, the identifier based on accessed user upstream traffic from a destination site;
  creates an entry in the redirecting device, wherein the entry has a time expiration period when the redirecting device will not query the consolidating and management device; and
  redirects a message, based on the accessed user upstream traffic, to a display on a message vehicle that occurs from the redirecting device without involvement from the destination site.

* * * * *